March 3, 1970  B. BARENYI  3,498,402
DRIVER SAFETY DEVICE FOR MOTOR VEHICLE
Filed June 29, 1967  3 Sheets-Sheet 1

INVENTOR

BELA BARENYI

BY Dicke & Craig
ATTORNEYS

March 3, 1970  B. BARENYI  3,498,402
DRIVER SAFETY DEVICE FOR MOTOR VEHICLE
Filed June 29, 1967  3 Sheets-Sheet 2

INVENTOR
BELA BARENYI

BY Dicke & Craig
ATTORNEYS

March 3, 1970 B. BARENYI 3,498,402
DRIVER SAFETY DEVICE FOR MOTOR VEHICLE
Filed June 29, 1967 3 Sheets-Sheet 3
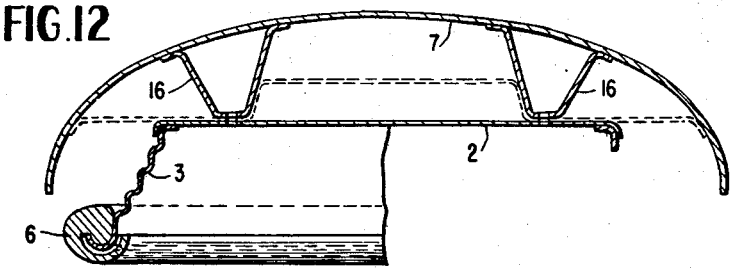
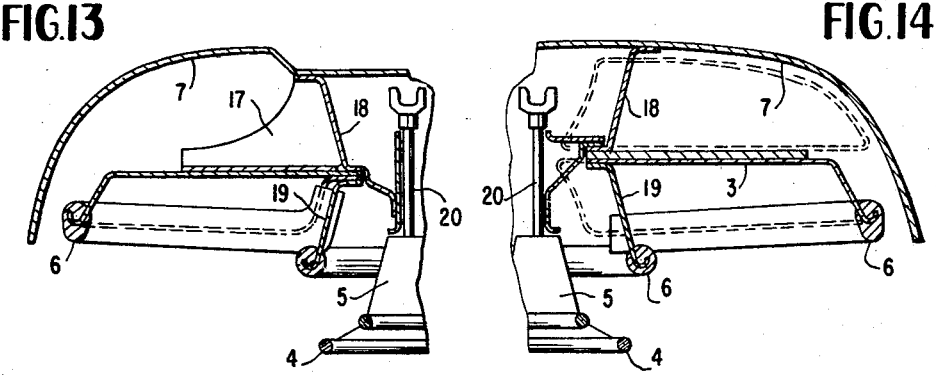
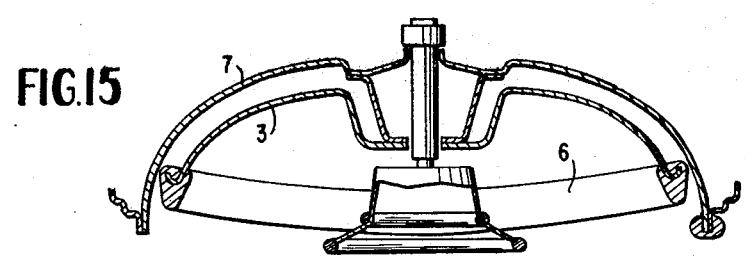
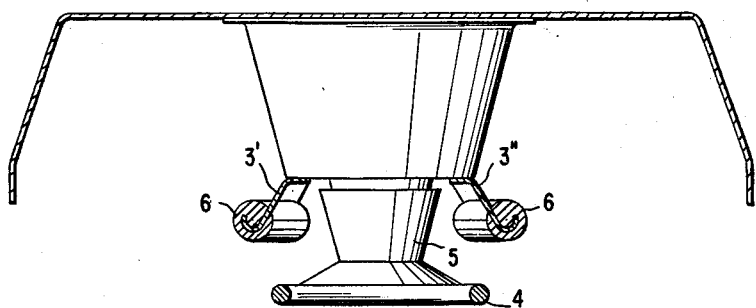
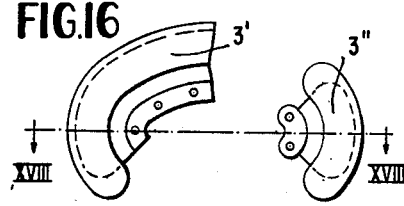
INVENTOR
BELA BARENYI
BY *Dicke & Craig*
ATTORNEYS

United States Patent Office 3,498,402
Patented Mar. 3, 1970

---

3,498,402
DRIVER SAFETY DEVICE FOR MOTOR VEHICLE
Bela Barenyi, Stuttgart-Vaihingen, Germany, assignor to Daimler-Benz Aktiengesellschaft, Stuttgart-Unterturkheim, Germany
Filed June 29, 1967, Ser. No. 654,031
Claims priority, application Germany, July 2, 1966, D 50,455
Int. Cl. B60k 37/00; B60r 27/00
U.S. Cl. 180—90                                30 Claims

ABSTRACT OF THE DISCLOSURE

A motor vehicle of the type either with or without instrument panel which includes a steering column on which is mounted a steering wheel and at least one or several deformation members arranged about or adjacent to the control unit of the vehicle whereby the deformation member or members project into the vehicle interior space; the deformation member or members become enlarged in a funnel-like manner in the direction toward the vehicle interior space and are supported at the vehicle forward closure wall either by way of the instrument panel and/or by means of additional or separate supports.

BACKGROUND OF THE INVENTION

The present invention relates to a motor vehicle with or without instrument panel, and aims at an improvement of the safety of the vehicle passengers in order that during accidents, injuries of the passengers are avoided or at least considerably lessened.

A number of motor vehicles are already known in the prior art which do not possess any instrument panel, as disclosed, for example, in the U.S. Patents 2,777,728; 2,-796,286; 2,921,812; and 2,980,466, in the German Patents 739,410; 885,938; 904,028; 944,350; and 975,769, in the Italian Patent 485,680 as well as in the French Patent 1,059,830. The actuating and control installations of the vehicle are accommodated in these prior art motor vehicles within a housing surrounding the steering column.

An instrument panel has already been proposed for the purpose mentioned hereinabove which is deformable and is able to absorb impact energy, as disclosed in German patent application D 44,296, filed in the name of the assignee of the present application; the U.S. application Ser. No. 451,908 (now Patent No. 3,341,248) corresponds to this last-mentioned application. With this last-mentioned instrument panel, the bending rigidity is greatest in a direction approximately perpendicular to the steering column and is smallest in a direction approximately perpendicular to this plane so that the instrument panel, in the event of impact of body parts of the passengers during accidents, is able to yield in the impact direction.

Additionally, it has already been proposed heretofore to arrange the instrument panel freely at a distance in front of the lower edge of the windshield and to arrange its securing surfaces located at the lateral ends within the area of the door columns or the like approximately in vehicle transverse direction. In the even of impact of body parts of the passengers during accidents, this instruments can yield considerably in the driving direction.

SUMMARY OF THE INVENTION

A further increase in the safety of the passengers is achieved with a vehicle, with or without instrument panel, according to the present invention by one or several deformation members arranged about or adjacent to the control unit and projecting in the direction toward the vehicle interior. The term "control unit" or "control means," used hereinafter, shall be interpreted to include the various operating devices for the vehicle, including the steering devices. In case of accidents, the body parts of the passengers thus impinge on a plastically deformable deformation member which yields everywhere, i.e., also within the area of the lateral edges and dissipates considerable energy. The danger of injury to the passengers in case of accidents is reduced thereby and the injuries are lessened.

The deformation member according to the present invention preferably consists essentially of generated surfaces or superficies which become enlarged in a funnel-like shape in the direction toward the vehicle interior. Particularly favorable is a freely supported or cantilever arrangement of the deformation member. For purposes of further increasing the safety, a second deformation member approximately surrounding the steering column may be arranged additionally within the deformation member. A particularly favorable arrangement results if the steering column is arranged, in a manner known per se, in the center of the vehicle. The deformation members may then be arranged mutually concentrically. At least the edges or rims of the deformation members are preferably provided with a padding.

In another advantageous construction of the present invention, the deformation member may be arranged at the instrument panel. The instrument panel is then appropriately constructed plastically deformable and is secured only with its center sections at the forward closure wall of the vehicle interior space.

In a preferred construction according to the present invention, the instrument panel, together with the deformation member, is arranged in a freely supported or cantilever manner at a relatively large distance in front of the forward closure wall, and a free space is present between the instrument panel together with the deformation member and the forward closure wall. As a result thereof, in case of impact of a passenger against the deformation member, not only the deformation member and partly also the instrument panel is compressed but additionally a bending and/or buckling of the instrument panel takes place at its securing place.

In order to assure a rattle-free securing with the last-mentioned type of mounting of the instrument panel and of the deformation member at the motor vehicle, the instrument panel, together with the deformation member, may be additionally supported by plastically deformable support parts.

Accordingly, it is an object of the present invention to to provide a motor vehicle of the aforementioned type which eliminates, by extremely simple means, the aforementioned shortcomings and drawbacks encountered with the prior art constructions.

Another object of the present invention resides in a passenger motor vehicle in which the safety of the passengers is greatly improved and the danger of serious injuries is avoided or at least considerably reduced.

A further object of the present invention resides in a motor vehicle, with or without instrument panel, in which deformation members are provided so as to absorb the impact energy in case of accidents by plastic deformation.

These and further objects, features, and advantages of the present invention will become more obvious from the following description when taken in connection with the accompanying drawing which shows, for purposes of illustration only, several embodiments in accordance with the present invention, and wherein:

FIGURE 12 is a cross-sectional view of a deformation member taken along line XII—XII of FIGURE 11;

FIGURES 13 and 14 are partial, longitudinal cross-sectional views through two modified embodiments of deforamtion members according to the present invention arranged in a freely supported, cantilever-like manner which are additionally supported by plastically deformable support parts;

FIGURE 15 is a longitudinal cross-sectional view through a still further modified embodiment of a deformation member in accordance with the present invention arranged in a cantilever-like manner;

FIGURE 16 is a plan view on the left half of a deformation member in accordance with the present invention arranged about the steering column;

FIGURE 17 is a plan view on the right half of a deformation member in accordance with the present invention arranged about the steering column; and FIGURE 18 is a cross-sectional view, taken along line XVIII—XVIII of FIGURES 16 and 17 through a deformation member according to FIGURES 16 and 17.

Figure 1:
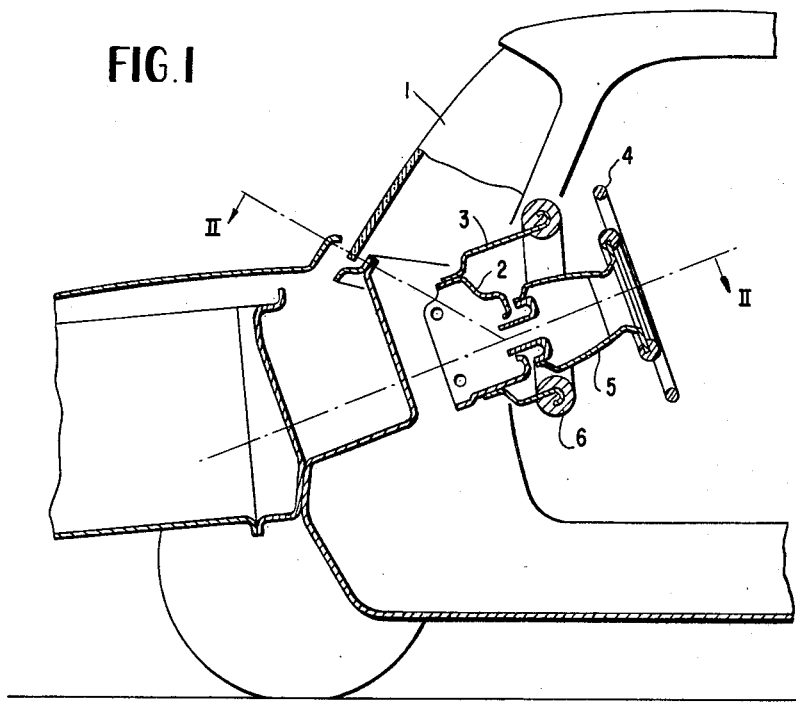
FIGURE 1 is a partial, longitudinal cross-sectional view through the front part of a motor vehicle provided with a deformation member in accordance with the present invention.
Figure 2:
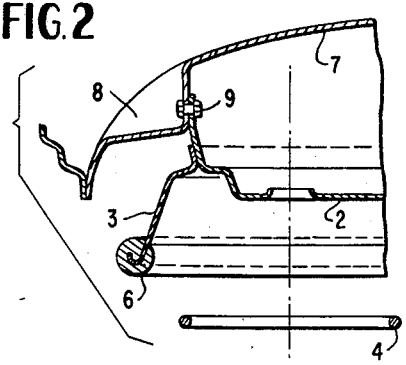
FIGURES 2 and 3 are partial, cross-sectional views through two embodiments of an instrument panel in accordance with the present invention, taken alonge line II—II of FIGURE 1, and illustrating two different fastening possibilities in accordance with the present invention at the forward closure wall of the vehicle interior space.
Figure 3:
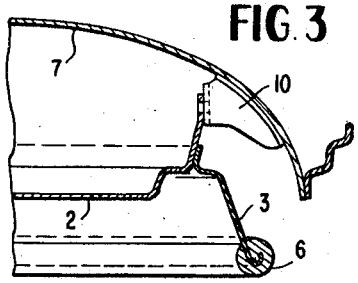

Referring now to the drawing wherein like reference numerals are used throughout the various views to designate like parts, and more particularly to FIGURE 1, reference numeral 1 designates therein a conventional motor vehicle of any known construction which includes an instrument panel 2 equipped with a deformation member 3 that is constructed plastically deformably and projects into the vehicle interior space. The plane of the cross-section through the instrument panel 2 is taken within the plane of the steering wheel 4 containing the axis thereof. The steering wheel 4 itself is carried by a deformation pot 5. In case of impact accident or frontal collision, at first the deformation pot 5 of the steering wheel 4 is deformed and the chest of the driver then impinges against the deformation member 3, also plastically deformable, of the instrument panel 2. Additional energy is dissipated by the deformation member 3 and the impact is lessened. The passenger, however, is as a rule far more endangered than the driver and heretofore hit with his body parts, in case of impact accidents, directly against the instrument panel or other vehicle parts without lessening of the impact. This will also be alleviated by the present invention in that, as shown in FIGURES 2 and 3, the deformation member 3 extends over the entire width of the vehicle so that the impact of the passenger sitting alongside the driver is also lessened. In the embodiment illustrated in FIGURE 1, the deformation member 3 essentially consists of a sheet metal member arranged in a casing-like or superficies-like manner which is connected at its forward, angularly bent end at the instrument panel 2. The free end of the sheet metal member is flanged over and provided with a padding 6.

The instrument panel 2 according to FIGURE 1 is illustrated in longitudinal cross section in FIGURES 2 and 3, it being understood that in these two figures as well as in the other partially illustrated figures to be described hereinafter, the other side is of mirror-image-like construction—except for the presence of the steering wheel. Two different types of fastening of the instrument panel 2 at the forward vehicle inner closure of fire wall 7 are illustrated in these two FIGURES 2 and 3. In FIGURE 2, the instrument panel 2 is connected to the forward vehicle interior wall 7 by way of a bulge 8 arranged in the vehicle interior wall 7 by means of bolts 9. In FIGURE 3, a fastening insert 10 is secured at the vehicle interior wall 7 on which the instrument panel 2 is adapted to be detachably connected by means of bolts in a similar manner as in FIGURE 2.

As can be readily seen from FIGURES 1 to 3, the upper and lower wall surfaces of the deformation member 3 are approximately parallel. The lateral wall surfaces of the deformation member 3, however, are enlarged in a funnel-shaped manner, whence a better deformability is achieved on the part of the deformation member 3.

Figure 4:
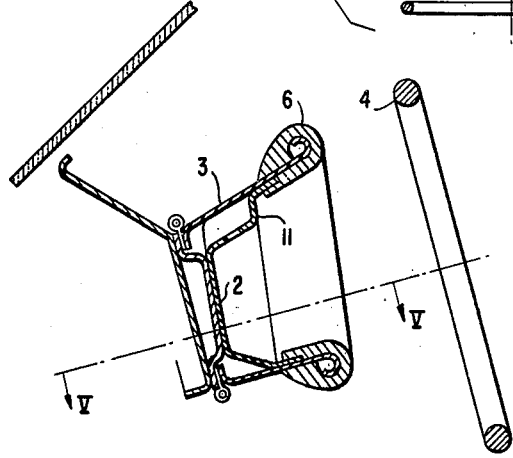
FIGURE 4 is a partial, longitudinal cross-sectional view, similar to FIGURE 1 of a further modified embodiment of a deformation member in accordance with the present invention.

A modified embodiment of an instrument panel 2 provided with a deformation member 3 is illustrated in cross section in FIGURE 4. In this embodiment also the upper and lower wall surfaces of the deformation member 3 are constructed so as to project, extending away from each other, in a funnel-shaped manner in the direction toward the vehicle interior. The deformation member 3 is additionally supported by a separate support 11 secured at the instrument panel 2.

Figure 5:
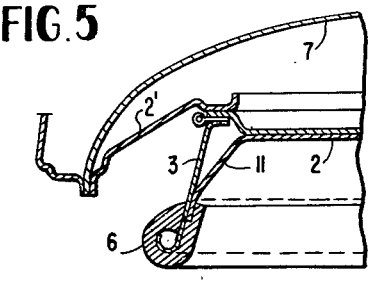
FIGURES 5 and 6 are cross-sectional views, similar to FIGURES 2 and 3, and taken along line V—V of FIGURE 4 representing again two different types of fastening of the deformation member according to FIGURE 4.
Figure 6:
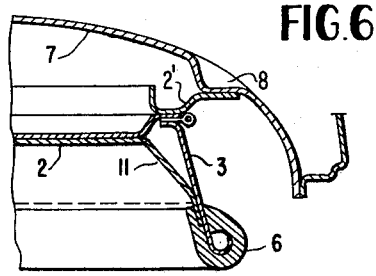

Two modified types of securing the instrument panel 2 according to FIGURE 4 at the forward vehicle interior space wall 7 are illustrated in longitudinal cross section in FIGURES 5 and 6. The securing itself may be realized by screws, bolts, rivets, or welded connections. In FIGURE 5, a transversely extending auxiliary support wall 2' is secured at its lateral longitudinal ends to the ends of the forward closure wall 7 by any conventional means. The deformation member 3 and instrument panel 2 are secured by means of common bolts or the like on auxiliary wall 2', while the separate support 11 is secured in any conventional manner, such as, bolts, rivets, or spot welding to the instrument panel 2. FIGURE 6 differs from FIGURE 5 in that the transversely extending auxiliary support wall 2' is connected at its lateral ends along transversely extending surfaces thereof to bulge portions 8 of the forward closure wall 7.

Figure 7:
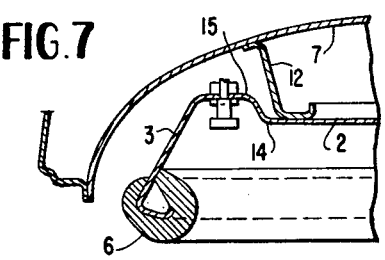
FIGURES 7 and 8 are cross-sectional views, similar to FIGURES 5 and 6, illustrating two further constructional embodiments and types of fastening of a deformation member according to the present invention and arranged in a partially cantilever-like manner.
Figure 8:
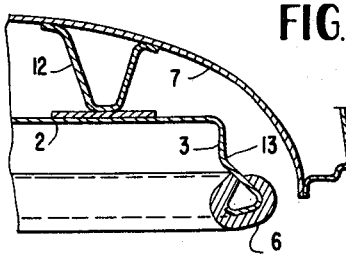

In FIGURES 7 and 8, two further constructions of the deformation member 3 are illustrated in longitudinal cross section which forms a one-piece unit, i.e., is integral with the instrument panel 2. The instrument panel 2 is connected only in its center section by way of intermediate members 12 with the forward closure wall 7 of the vehicle interior space. The lateral ends of the instrument panel 2 are free so that a partially freely supported or partial cantilever-like securing of the instrument panel 2 at the forward closure wall 7 of the vehicle interior space results. The deformation member 3 or the instrument panel 2 according to FIGURES 7 and 8 are provided with one or several additional offsets or bends 13, 14 and 15 though the offsets 13, 14 and 15 may also be used together in each of FIGURES 7 and 8. With a deformation member 3 according to FIGURES 7 and 8, the deformation member 3 can be compressed in case of accident and additionally the instrument panel 2 can also be bent at its side whereby additional energy is dissipated.

Figure 9:
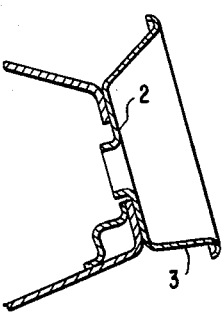
FIGURES 9 and 10 are partial, longitudinal cross-sectional views through two different constructions of a deformation member in accordance with the present invention.

Still a further modified embodiment of a deformation member 3, which again forms a unit with the instrument panel 2, is illustrated in cross section in FIGURE 9.

Figure 10:
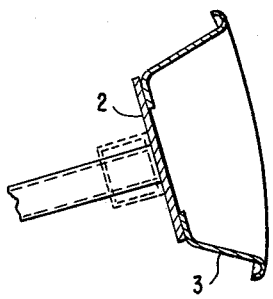

FIGURE 10 illustrates a modified deformation member 3 which is mounted on the instrument panel 2 and in which the lower wall surface projects in the shape of a particularly wide funnel.

Figure 11:
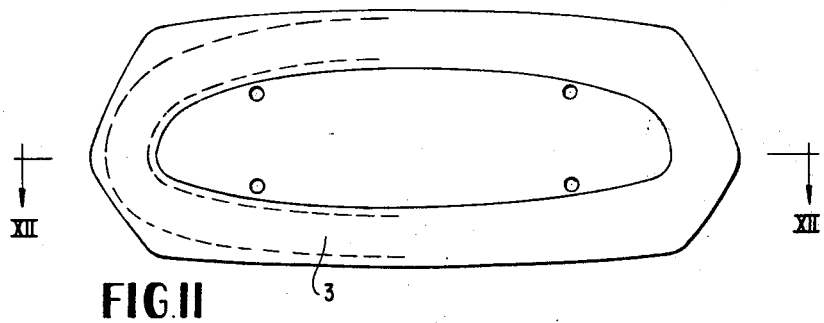
FIGURE 11 is a plan view on a deformation member in accordance with the present invention.

FIGURE 11 illustrates a plan view on a deformation member 3; in the left half of this figure, the configuration of the funnel-shaped deformation member 3 is indicated in dash lines.

FIGURE 12 illustrates a longitudinal cross section through the deformation member 3 according to FIGURE 11. The deformation member 3 is offset in a step-shaped manner whereby a particularly good deformability is achieved. The edge of the deformation member 3 is provided with a padding 6. The deformation member 3 is secured at the instrument panel 2. The instrument panel itself is supported by two bracket-like mounts or supports 16.

FIGURE 13 illustrates a deformation member 3 according to the present invention which is arranged in a freely supported or cantilever-like manner. In order to secure this deformation member 3 against vibrations and rattles, it is retained by means of an additional support 17 which is arranged between the deformation member 3 and the steering column support 18. The relatively large space remaining between the deformation member 3 and the forward closure wall 7 of the vehicle interior space is free, i.e., empty so that the deformation member 3 can be deformed in case of an impact of a motor vehicle passenger and can be angularly bent. An additional deformation member 19 is provided in addition to the deformation member 3 extending over the entire width of the vehicle, which additional deformation member 19 surrounds the steering 4, 5. The steering 4, 5 is arranged in the center of the vehicle. This further deformation member 19 concentrically surrounding the steering column 20 serves in particular for preventing serious injuries of the driver.

An arrangement with two deformation members 3 and 19, corresponding to FIGURE 13, is illustrated in FIGURE 14 which illustrates a further possibility of fastening and securing the deformation members 3 and 19 at the steering column support 18 and at the forward closure wall 7 of the vehicle interior space.

A particularly favorable construction of the deformation member 3 is illustrated in FIGURE 15. The deformation member 3 is constructed as relatively flat, slightly arched funnel and is arranged in a cantilever-like manner. No further vehicle parts are present between the deformation member 3 and the forward closure wall 7 of the vehicle interior space so that the deformation member 3 can be strongly deformed in case of impact thereagainst of a vehicle passenger and is thereby yieldingly bent or buckled in the forward direction about the cantilever support. The dissipation of impact energy is particularly large with this embodiment.

Instead of the deformation member 3 extending over the entire width of the vehicle as shown in FIGURE 15, of course, only a single smaller deformation member may be provided, which surrounds exclusively the steering mechanism of the vehicle within a partial area thereof.

FIGURE 16 illustrates the left-half of a deformation member 3' which, in the form of a horseshoe, surrounds exclusively the upper part of the steering wheel, whereas in FIGURE 17 the right half of a deformation member 3" is illustrated which is arranged at both sides of the steering mechanism.

The arrangement of the deformation members 3' and 3" according to FIGURES 16 and 17 is illustrated in cross section in FIGURE 18.

While I have shown and described several embodiments in accordance with the present invention, it is understood that the same is not limited thereto but is susceptible of numerous changes and modifications as known to a person skilled in the art, and I therefore do not wish to be limited to the details shown and described herein, but intend to cover all such changes and modifications.

I claim:

1. In a motor vehicle having an interior space for accommodating a driver and passengers and having a vehicle control unit, including steering means, disposed within said interior space accessible to the driver, the improvement comprising at least one deformable member supported by a fixed vehicle part and disposed in front of the driver, said deformable member including at least one annular plastically-deformable surface surrounding said control unit and extending in the direction of the interior space of the vehicle, said annular surfaces diverging, in a funnel-like manner, in the direction of the interior space of the vehicle.

2. The improvement according to claim 1, wherein said motor vehicle further includes an instrument panel disposed within said interior space and supporting said vehicle control unit, said deformable member being connected with said instrument panel.

3. The improvement according to claim 2, wherein said instrument panel is constructed plastically deformable and is secured in its center section at a forward wall of the vehicle interior space.

4. The improvement according to claim 1, wherein several of said deformable members are provided.

5. The improvement according to claim 4, wherein at least the edges of each deformable member are provided with padding means.

6. The improvement according to claim 5, wherein the deformable members are arranged at the instrument panel.

7. The improvement according to claim 6, wherein said instrument panel is constructed plastically deformable and is secured in its center section at the forward wall of the vehicle interior space.

8. The improvement according to claim 7, wherein said instrument panel together with the deformable members are arranged in a cantilever-like manner at a relatively large distance in front of the forward wall of the vehicle interior space and a free space is present between the instrument panel together with the deformable members and said forward wall.

9. The improvement according to claim 8, further comprising plastically deformable support means additionally supporting the instrument panel together with the deformable members at said forward wall.

10. The improvement according to claim 4, wherein each deformable member is arranged in a cantilever manner.

11. The improvement according to claim 1, further comprising a second deformable member approximately surrounding the steering means and arranged radially-inwardly of the first deformable member.

12. The improvement according to claim 11, wherein the deformable members are arranged substantially eccentrically to each other.

13. The improvement according to claim 12, wherein the steering means is arranged approximately in the transverse center of the motor vehicle.

14. The improvement according to claim 13, wherein at least the edges of each deformable member are provided with padding means.

15. The improvement according to claim 14, wherein the deformable member is arranged at the instrument panel.

16. The improvement according to claim 15, wherein said instrument panel is constructed plastically deformable and is secured in its center section at the forward wall of the vehicle interior space.

17. The improvement according to claim 16, wherein said instrument panel together with the deformable members are arranged in a cantilever-like manner at a relatively large distance in front of the forward wall of the vehicle interior space and a free space is present between the instrument panel together with the deformable members and said forward wall.

18. The improvement according to claim 17, further compriisng plastically deformable support means additionally supporting the instrument panel together with the deformable members at said forward wall.

19. The improvement according to claim 1, wherein each deformable member is arranged in a cantilever manner.

20. The improvement according to claim 19, further comprising a second deformable member approximately surrounding the steering means and arranged radially-inwardly of the first deformable member.

21. The improvement according to claim 20, wherein the deformable members are arranged substantially concentrically to each other.

22. The improvement according to claim 21, wherein the steering means is arranged approximately in the transverse center of the motor vehicle.

23. The improvement according to claim 1, further comprising a second deformable member approximately surrounding the steering means and arranged radially-inwardly of the first deformable member.

24. The improvement according to claim 23, wherein the deformable members are arranged substantially concentrically to each other.

25. The improvement according to claim 23, wherein the steering means is arranged approximately in the transverse center of the motor vehicle.

26. The improvement according to claim 1, wherein at least the edges of each deformable member are provided with padding means.

27. The improvement according to claim 1, wherein said motor vehicle further includes an instrument panel disposed within said interior space and supporting said vehicle control unit and a forward wall defining the forward end of said interior space, said instrument panel together with the deformable members being arranged in a cantilever-like manner at a relatively large distance in front of the forward wall of the vehicle interior space and a free space being present between the instrument panel together with the deformable members and said forward wall.

28. The improvement according to claim 27, further comprising plastically deformable support means additionally supporting the instrument panel together with the deformable members at said forward wall.

29. The improvement according to claim 1, wherein the steering means is arranged approximately in the transverse center of the motor vehicle.

30. The improvement according to claim 1, wherein said motor vehicle further includes a forward wall defining the forward end of said interior space, said deformable member being connected with said forward wall.

References Cited

UNITED STATES PATENTS

| | | | |
|---|---|---|---|
| 3,167,974 | 2/1965 | Wilfert | 74—552 |
| 3,285,091 | 11/1966 | Fiala | 280—150 |
| 3,368,422 | 2/1968 | Walter | 180—90 |

FOREIGN PATENTS

| | | |
|---|---|---|
| 1,131,568 | 10/1956 | France. |
| 999,219 | 7/1965 | Great Britain. |
| 1,214,558 | 4/1966 | Germany. |

KENNETH H. BETTS, Primary Examiner

U.S. Cl. X.R.

280—150